Figure 1:
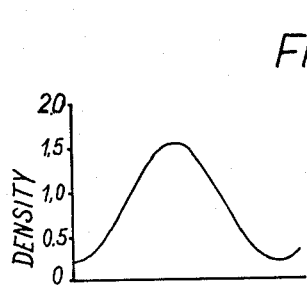

Jan. 5, 1965 W. REBNER 3,164,470
CONTACT SCREENS FOR REPRODUCTION PHOTOGRAPHY
Filed Dec. 28, 1960 3 Sheets-Sheet 1

INVENTOR.
WERNER REBNER
BY Connolly and Hutz
ATTORNEYS

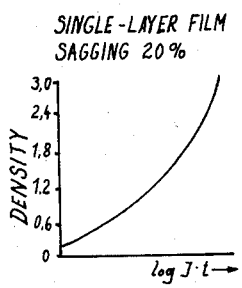
FIG.8 — SINGLE-LAYER FILM SAGGING 20%
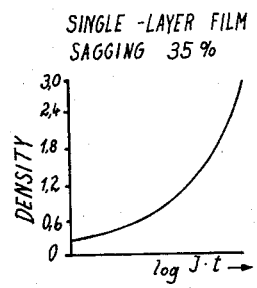
FIG.9 — SINGLE-LAYER FILM SAGGING 35%
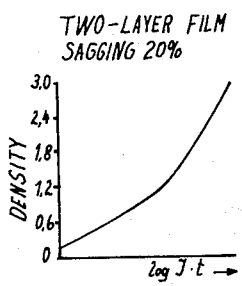
FIG.10 — TWO-LAYER FILM SAGGING 20%
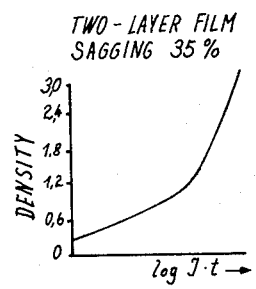
FIG.11 — TWO-LAYER FILM SAGGING 35%
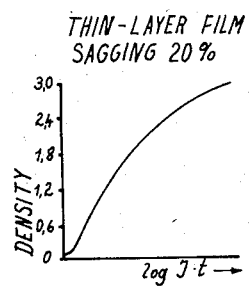
FIG.12 — THIN-LAYER FILM SAGGING 20%
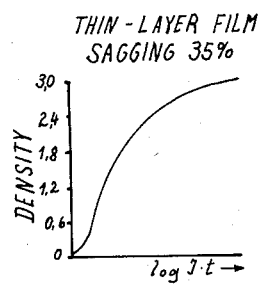
FIG.13 — THIN-LAYER FILM SAGGING 35%

INVENTOR.
WERNER REBNER
BY Connolly and Hutz
ATTORNEYS 3,164,470
CONTACT SCREENS FOR REPRODUCTION
PHOTOGRAPHY
Werner Rebner, Cologne-Stammheim, Germany, assignor to Agfa Aktiengesellschaft, Leverkusen, Germany, a corporation of Germany
Filed Dec. 28, 1960, Ser. No. 78,902
4 Claims. (Cl. 96—116)

The present invention relates to a contact screen to be used in the graphic arts and to a process of producing such a screen.

Whereas the engraved screen consists of a sharply defined line system which is arranged in a plane parallel to the exposure plane at a spacing (screen spacing) which varies according to the exposure conditions, the contact screen has a screen structure of a continuous tone nature which must be brought into closest contact with the material to be exposed. As to the most usual embodiment of a contact cross-line screen, the lines of which are at an angle of 90°, it is a characteristic of the contact screen that it consists of dots which increase in density towards the center of the dot and reach a maximum density at this center point. When the density distribution of such a contact screen is graphically represented, there is produced a curve in which the density increases from a minimum to a maximum and decreases from the latter in a mirror-image path towards the minimum. Typical curves showing the density distribution of dots of such contact screens are included as FIGS. 1, 2 and 3 of the accompanying drawings.

The shape of such a contact screen dot can comprise all intermediate stages from a circle and via the square to the form of a rectangle with curvilinear boundary lines, depending on the proportion of light diffraction in the production of a contact screen from an engraved master screen and depending on the special form of diaphragm which has been used in its production.

These and the following considerations also apply appropriately to all types of contact screens which can be produced from an arbitrary engraved screen. Examples of such engraved screens are cross-lined screens, the lines of which are at an angle differing from 90°, dot screens, intaglio screens of any desired line structure, and lined screens, in which case the properties apply to light ratio between opaque and transparent lines or each area ratio between opaque and transparent areas.

The efficiency of a contact screen depends on two characteristics:

(1) The density range of a contact screen, that is to say, the range between maximum density and minimum density of the contact screen dots; and (2) The density gradation of the individual contact screen dots.

The aforementioned density range of the contact screen dot limits the contrast range of an image which can be reproduced in the printing process. Tone values of an original which exceed the density range of a contact screen dot are lost in the screening. They can be saved by an initial exposure, i.e., an exposure without interposition of the continuous tone original, up to maximum of 0.2 of the image contrast values, because in this range below-threshold image exposures are intensified. If the contrast range of the original is smaller than the density range of the contact screen dot, then it is possible by means of a known auxiliary exposure (final exposure without screen when using a litho-film) to produce the image screening up to the final offset point. In the case of black-and-white contact screens, usually screens having three different density ranges (about 1.2, 1.5 and 1.8) are used in order to meet all requirements of the art. In the case of magenta screens, color filters are additionally applied in order to influence the density range of the contact screen.

The quality of the tone reproduction in screened prints made with a contact screen is dependent upon the density gradation of the individual screen dots.

The present invention is concerned with contact screens for use in making positives from continuous tone negatives or negatives from continuous tone positives, which contact screens have a novel density gradation of the screen dots, and which contact screens given correct reproduction of the tone valves in screened prints made therewith.

The significance of the gradation of the dot density for a contact screen in reproducing the correct tone value has not previously been fully recognized.

Figure 2:
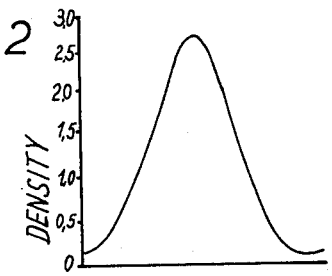
Figure 3:
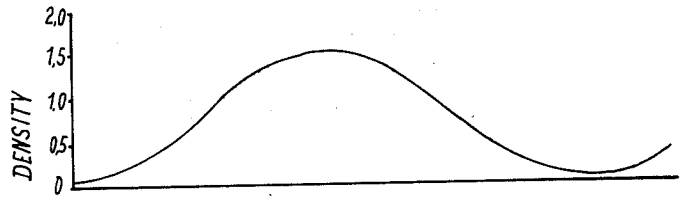

In order to provide a survey concerning the present state of the art, many known contact screens which are used in practice have been evaluated. The density measurements of the dot density gradations of these contact screens were made with an apertured diaphragm having a diameter of 9.6 microns. Without exception, they produced a density gradation which has characteristics comparable with a wave train. The density minimum of the dot profile corresponds to the wave trough, the density maximum to the wave crest, the density range of the contact screen dot to the amplitude and the value $$\frac{\sqrt{2}}{N} \text{ cm.}$$

to the wave length, N representing the number of screen lines per cm. Between the density end stages of these contact screen dots, the density curve extends symmetrically with respect to the mean density (=density which is at the center between minimum and maximum). Up to the mean density, the curve rises with increasing steepness and then becomes flatter again in the rhythm. Such a diagram corresponds exactly to the contact screen dot of a coarse screen, for example, a screen with 24 rows. As the number of lines or rows on the screen per cm. increases, the flank path of the dot density curve extends with an increasing rectilinear form in its central portion. The inclination angle of this central curve portion becomes greater as the density range of the contact screen increases and becomes smaller as the number of lines per cm. of the screen decreases (FIGURES 1 to 3).

The same contact screens are commonly used for the production of both screen diapositives and screen negatives. In many cases, commercial contact screens that are designed only for the production of screen diapositives or screen negatives do not differ from each other with respect to their dot density gradations and they do not deviate from the hereinbefore described general characteristics of an undulatory form of density curve.

When these contact screens are used for the production of the screen diapositive, the results produced have the same defect or error, with slight deviations from one another. Instead of the rectilinearly ascending density curve which is to be expected, each screened diapositive obtained with these screens from an equally spaced continuous tone wedge as negative original produces a sagging curve when the density of the screen tone stages produced is plotted against the density stages of the continuous tone negative.

This error is shown in the screen diapositive by a levelling of the tone in the image highlight, by too low a density in the middle tone of the image, and by an excessive steep contrast in the image shadows.

Also when these contact screens are used for the production of the screen negative a similar error is produced with slight deviations from one another.

Instead of the screen negative formed therewith from an equally spaced continuous tone wedge as positive original producing the expected Harrison density curve for the screen negative (J. of Photography, 1955, page 97), it produces a density curve sagging to an insufficient degree with respect to the Harrison curve when the density of the resulting screen tone stages are plotted against the density stages of the continuous tone positive. As regards the image, after the screen negative has been copied to form the screen diapositive, this error acts in the same way as in the direct production of a screen diapositive in the manner described in the preceding paragraph, namely by a levelling of tone in the image highlights, a too low density in the medium tone of the image, and an excessively steep contrast in the image shadow portion.

These errors of the contact screens used for the image screening to form a diapositive or negative are known and have been described in the technical literature. As also established in the technical literature, contact screens which satisfy the condition of a screening with correct tone values still do not exist. Moreover, there has still not been disclosed any method solving this problem which is important in the printing art, namely of producing a contact screen which leads to screen diapositives or screen negatives having correct tone values using auxiliary means.

Proposals have also been made for improving the tone value reproduction by particular shaping of the contrast profile of a contact screen dot. Thus, German Patent No. 874,708 discloses a density gradation of the contact screen dot, in which the dot density curve shows a shallow rise in the portions of smallest contrast, a steep rise in the portions of medium contrast, and once again a weak rise in the portions of strong contrast. This dot density formation is however not suitable for correctly reproducing the image tone value in the screening. Data are lacking concerning the density components and the gradations of the partial layers in the density formation of the dot and concerning the production of such a contact screen. Furthermore, the publication by Stiehler in "Druck und Papier," 1958, Part 2, pages 24–28, is a theoretical consideration of the question of how the density within a screen dot in the contact screen must increase in order that the tone value losses that occur between the original and print are the minimal. By simplified calculations Stiehler arrives at a curve of depth of sag for the density gradation of a contact screen dot (which is intended for the image screening to form the diapositive), the depth of sag of the said curve being expressed in the following manner:

"By the term "depth of sag" of a screen dot density gradation, there is to be understood the maximum deviation of the sagging curve, ascending from density minimum to density maximum, from an imaginary rectilinearly extending connecting line of the end points of the curve. The sag can be positive or negative (i.e., upwardly curved). In order to find a common reference system for the depth of sag of dot density gradations of different density ranges, the curves to be compared are so converted into a system of coordinates that the connecting lines of the curve end points rise with a gamma 1.0. From the ratio between the depth of sag and the half length of the straight connecting line of the curve end points, the sag is then computed and referred to as a percentage.

The Stiehler curve shows a sag of 40 percent. This sag becomes greater than 40 percent when it is taken into account that this curve makes no reference to the highest density stages and in fact to 8 percent of the total dot density gradation. As the Stiehler curve already has a sag of 40 percent, it cannot be used for the productino of screened images having correct tone values. Stiehler referred subsequently in the publication to his calculations based on some "real" factors. The final result is a curve which, in a manner similar to that referred to in the aforesaid German patent, starts with a shallow rise, then becomes steeper and then levels off again in the upper density stages. This curve is also unsuitable for the correct reproduction of tone values. Information is lacking as to how a contact screen can be produced in accordance with Stiehler's calculations.

It has now been found that contact screens for the screening of images to form a diapositive or negative are particularly suitable if the dot density gradation of the contact screen dot, ascending from the density minimum to the density maximum, sags positively for the diapositive contact screen and negatively for the negative contact screen, and in fact within a sagging range from 15 to 35 percent and advantageously in the range from 20 to 30 percent.

Figure 4:
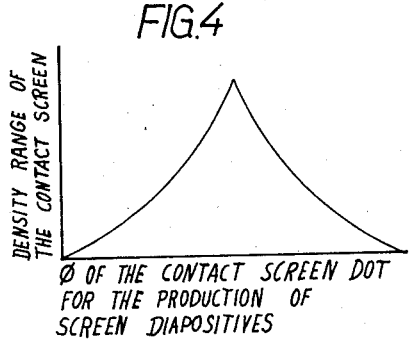
Figure 5:
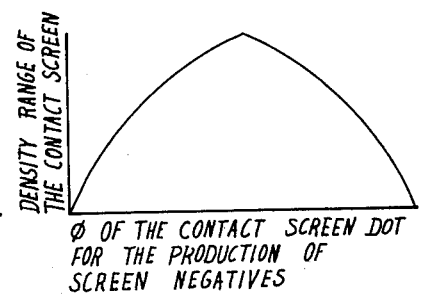
Figure 6:
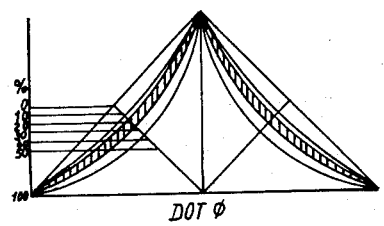
Figure 7:
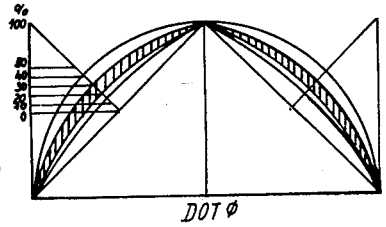
Figure 14:
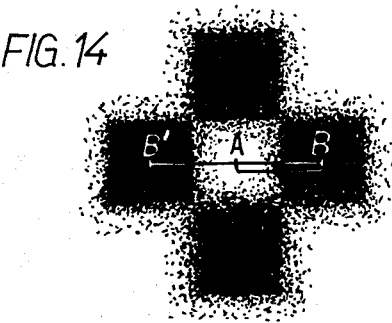

Such a dot density gradation is shown in the accompanying drawings. FIG. 4 is a curve showing the density distribution of dots of a contact screen for the production of a screen diapositive and in FIG. 5 is shown the density distribution of dots of a contact screen for the production of a screen negative. In FIG. 6 and FIG. 7 are shown the sagging ranges for a diapositive and a negative contact screen, respectively.

It was not to be expected that a correction of the tone value reproduction of a contact screen could be produced by the previously described and numerically defined sagging density gradation of the contact screen dot.

Moreover, no information has so far existed concerning the relationships between dot density gradation and tone value reproduction of a contact screen.

For the production of the contact screens with the dot density gradation according to the invention, it is possible to use a photographic material of which the density curve between the density stages 0.3 and 3.0 sags by 20 to 35 percent. Suitable for this purpose are very fine-grained single-layer films with a sagging density curve, a multilayer films of which the component layers so differ from one another in light-sensitivity and in gradation that the steeper gradation is associated with the lower light sensitivity. The component layers of the multilayer films can also be differently sensitized. In this way there is obtained an additional possibility of influencing the formation of the contact screen dot according to plan, since each component layer on exposure can be preferentially affected by suitable use of filters.

The contact screen produced with such films can be developed to form grey screens or can be developed chromogenically.

The use of single-layer films with a positively sagging density curve or of multilayer films are characterized above for the production of highlight-masked and/or shadow-masked continuous tone images is for example known from Belgian Patent No. 558,670 and has been proposed in Belgian Patents Nos. 561,126 and 564,693.

According to the invention, films of the above types are used in the production of contact screen dots. It was not known to those skilled in the art nor was it ot be expected that the dot intensity gradation of a contact screen dot in the ascent and descent of the dot densities can be influenced according to plan by the gradation path of the photographic material which is used.

Figure 15:
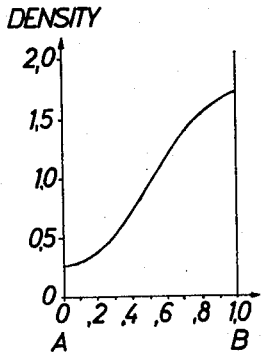

The data disclosed above for characterizing the density gradation of the contact dot may also be represented in the following manner:

The density gradation of a contact dot is determined by means of a microdensitometer having an aperture diameter of about 10 microns or less. The determinations of density are carried out along a line which is obtained by connecting diagonally two points of maximum density (that is ot say two dot centers) with each other as illustrated in FIGURE 4 which represents the dots of a contact screen on an exaggerated scale. In this figure the point B and B' represent dot centers. In the middle between B and B' there is the point of minimum density A. When measuring the density gradation, the distance from the point A to the point B is taken as unity. By plotting the density values against the location of the point of measurement along the line A—B, there is obtained a curve as shown in FIGURE 15.

In order to eliminate the influence of the different density ranges of single contact screens, the ratio of the density gradient to the respective density range is maintained within various definite ranges of relative gradients ($\gamma$ rel.) as defined by the following equation:

$$\text{Relative gradient} = \frac{\text{density gradient}}{\text{density range}} = \gamma \text{ rel.}$$

Figure 16:
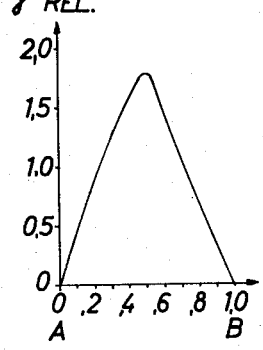

A curve illustrating the relative gradient distribution of a contact screen dot is shown in FIGURE 16. This curve begins at the point A at the zero mark with a relative gradient of 0, rises to a maximum then drops to zero at B, which is the 1.0 mark.

The density gradation of the contact screen dots of the present invention is characterized by the following data:

(A) Contact screens used for producing positives from continuous tone negatives (diapositive contact screens) have a relative gradient between 0.1 and 0.9 of the way (AB) from the minimum density to the maximum density which relative gradient steadily increases monotonically within the following ranges: from a relative gradient of 0.70 at 0.1 to a relative gradient of 1.80 at 0.9 on the one hand up to a relative gradient of 0.20 at 0.1 to a relative gradient of 2.50 at 0.9; and preferably; from a relative gradient of 0.55 at 0.1 to a relative gradient of 2.00 at 0.9 on the one hand up to a relative gradient of 0.35 to 0.1 to a relative gradient of 2.45 at 0.9.

(B) Contact screens used for producing negatives from continuous tone positives (negative contact screens) have a relative gradient between 0.1 and 0.9 of the way (AB) from the minimum density to the maximum density which relative gradient steadily decreasing monotonically within the following ranges: from a relative gradient of 1.80 at 0.1 to a relative gradient of 0.70 at 0.9 on the one hand up to a relative gradient of 2.50 at 0.1 to a relative gradient of 0.20 at 0.9; and preferably; from a relative gradient of 2.00 at 0.1 to a relative gradient of 0.55 at 0.9 on the one hand up to a relative gradient of 2.45 at 0.1 to a relative gradient of 0.35 at 0.9.

Figure 17:
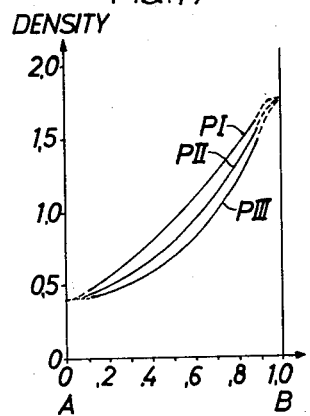
Figure 18:
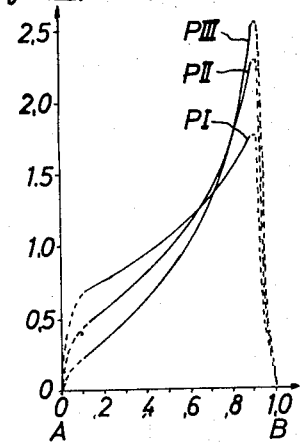

In FIGURE 17 of the accompanying drawings are represented density curves (designated PI, PII, PIII) of contact screens for producing screened diapositives of which curves PI and PIII limit the zone within which the density curves of the present screen dots are situated which effect a useful tone reproduction. In the middle between PI and PIII there is the optimum curve for obtaining a high quality tone reproduction. This curve is designated as PII. FIGURE 18 shows the relative gradients of PI, PII and PIII.

Figure 19:
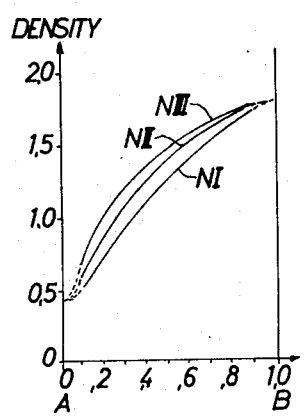
Figure 20:
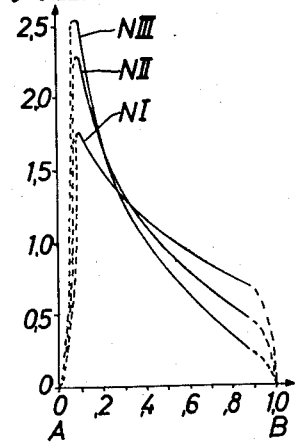

FIGURE 19 represents three density curves NI, NII, NIII of contact screens for the production of screened negatives. Curves NI and NIII limit the zone within which the density curves of the present screen dots are situated which effect a useful tone reproduction. The ideal curve is represented by NII. FIGURE 20 illustrates the relative gradients of NI, NII and NIII.

The following tables contain the values for the densities and for the relative gradients along the distance A—B between the minimum density and the maximum density of the contact screen dot according to the above definition.

TABLE I

| Dot Type | Density at Distance | | | | | | | | | | | |
|---|---|---|---|---|---|---|---|---|---|---|---|---|
| | 0 | .1 | .2 | .3 | .4 | .5 | .6 | .7 | .8 | .9 | 1.0 | Density Range |
| PI | 0.40 | 0.46 | 0.56 | 0.67 | 0.80 | 0.93 | 1.09 | 1.26 | 1.46 | 1.69 | 1.80 | 1.4 |
| PII | 0.40 | 0.43 | 0.50 | 0.58 | 0.68 | 0.80 | 0.95 | 1.12 | 1.34 | 1.62 | 1.80 | 1.4 |
| PIII | 0.40 | 0.43 | 0.47 | 0.53 | 0.61 | 0.71 | 0.84 | 1.00 | 1.21 | 1.51 | 1.80 | 1.4 |
| NI | 0.40 | 0.51 | 0.74 | 0.94 | 1.11 | 1.27 | 1.40 | 1.53 | 1.64 | 1.74 | 1.80 | 1.4 |
| NII | 0.40 | 0.58 | 0.87 | 1.08 | 1.25 | 1.40 | 1.52 | 1.62 | 1.70 | 1.77 | 1.80 | 1.4 |
| NIII | 0.40 | 0.69 | 0.99 | 1.20 | 1.36 | 1.49 | 1.59 | 1.67 | 1.73 | 1.77 | 1.80 | 1.4 |

TABLE II

| Dot Type | Relative Gradient at Distance | | | | | | | | | | |
|---|---|---|---|---|---|---|---|---|---|---|---|
| | 0 | .1 | .2 | .3 | .4 | .5 | .6 | .7 | .8 | .9 | 1.0 |
| PI | 9 | 0.69 | 0.75 | 0.85 | 0.93 | 1.04 | 1.17 | 1.32 | 1.53 | 1.77 | 0 |
| PII | 0 | 0.45 | 0.55 | 0.66 | 0.79 | 0.94 | 1.12 | 1.36 | 1.72 | 2.30 | 0 |
| PIII | 0 | 0.24 | 0.36 | 0.50 | 0.63 | 0.80 | 1.00 | 1.29 | 1.71 | 2.55 | 0 |
| NI | 0 | 1.77 | 1.53 | 1.32 | 1.17 | 1.04 | 0.93 | 0.85 | 0.75 | 0.68 | 0 |
| NII | 0 | 2.30 | 1.72 | 1.36 | 1.12 | 0.94 | 0.79 | 0.60 | 0.55 | 0.45 | 0 |
| NIII | 0 | 2.55 | 1.71 | 1.29 | 1.00 | 0.80 | 0.63 | 0.50 | 0.36 | 0.24 | 0 |

*Example 1*

For the production of the diapositive contact screen there is used a fine-grained single-layer film of medium sensitivity, the density curve of which, between the density stages 0.3 and 3.0, sags by 20–35 percent and with development at an infinite gamma value only tilts down above the density 3.0. The film is capable of being flexibly influenced in its total gradation by shortening the development time or by suitable dilution of the developer (see FIGURES 8 and 9).

The increase in gamma value of the film between the densities 0.3 and 3.0 should be at least 1.5 and at most 2.7, for instance the gamma should increase from 0.5 at density 0.3 to 2.0 at density 3.0 (FIGURE 8) or from 0.3 at density 0.3 to 3.0 at density 3.0 (FIGURE 9).

A suitable film may be produced by using a mixture of 30 to 50 percent by weight of a Brovira-hard emulsion and 70 to 50 percent by weight of a Brovira-soft emulsion, adding to said mixture the ordinary hardening and wetting agents, and coating said mixture on a film support to produce a layer of 0.02 mm. thickness. (The aforementioned emulsions are disclosed in BIOS-Report, Target No. C 9/408, Final Report No. 252). The film has an antihalation layer on its uncoated side.

After exposure the film is developed for 6–8 minutes at 20° C. in a developer of the following composition:

|  | G. |
|---|---|
| Sodium sulfite (anhydrous) | 85 |
| o-Phenylendiamine | 12 |
| p-Methylaminophenol sulfate | 12 |
| Potassium metabisulfite | 9 |
| Water to make 1000 cc. | |

Example 2

For the production of the diapositive contact screen there is used a fine-grained two-layer film the component layers of which differ from one another in gradation and in light sensitivity. The gamma value of the steeper layer is between 1.6 and 3.0 when the layer with a softer gradation produces a gamma value of about 0.6. The layer with a softer gradation has a speed which is about 10 to 50 times as high as that of steeper gradation. The layers can be arranged as desired relative to one another. Both layers must react in a flexible manner to adapted development conditions (see FIGURES 10 and 11).

A suitable film is produced by coating a Brovira-soft silver halide emulsion on the front side of a transparent film support having an anti-halation layer on the backside to produce a layer having a thickness of about 0.008–0.009 mm. and coating on said first layer a 0.005 mm. thick layer of a Brovia-extra-hard silver halide emulsion. These emulsions are also disclosed in the BIOS-Report that was referred to hereinbefore. The material after being exposed is developed in the same manner as disclosed in Example 1.

Example 3

For the production of the diapositive contact screen, there is used a two-layer film according to Example 2, only with the difference that both layers in addition differ from one another as regards sensitization, so that each of the component layers can be preferentially influenced by using filters:

(a) Blue-sensitive and orthochromatic, or vice versa
(b) Blue-sensitive and red-sensitive with a gap in the green or vice versa
(c) Orthochromatic and panchromatic or vice versa The speed of the layer with the softer gradation is about 30 times as high as that of the layer with the steeper gradation, whereas the gradations of the layers may vary within the limits disclosed in Example 2.

Example 4

For the production of the negative contact screen, there is used a fine-grained single-layer film of medium sensitivity, the density curve of which, between the density stages 0.3 and 3.0, extends with a negative sag of 20–35 percent (see FIGURES 12 to 13).

The density curves of these films should have a decrease of gradation of at least 1.5 and at most 2.7 between densities 0.3 and 3.0. By way of example the gamma of the curve should decrease from 2.0 at density 0.3 to 0.5 at density 3.0 (FIGURE 12) or from 3.0 at density 0.3 to 0.3 at density 3.0 (FIGURE 13).

The layer is produced from a mixture containing between 50 and 80 percent of a Brovira-extra-hard emulsion and between 50 and 20 percent of an emulsion of the same type which has a speed which is about one fourth to one eighth of that of the first emulsion.

Example 5

The latent image of the diapositive contact screen obtained according to Examples 1 to 3 is subjected to reversal development instead of normal development and fixing. A negative contact screen is obtained.

Example 6

The latent image of the negative contact screen obtained according to Example 4 is subjected to reversal development instead of normal development and fixing and a positive contact screen is obtained.

The production of contact screens with the photographic material described in Examples 1 to 6 does not differ from the operating technique usual for such work. It is advisable to use a reproduction camera which guarantees a plano-parallel arrangement of the engraved screen relative to the exposure surface and which enables the screen spacing to be adjusted with an accuracy of ±0.2 mm. The quality of any contact screen, disregarding the dot density formation which is desired, depends primarily on the point of the light cone forming behind the screen aperture touching the photographic layer (see "Papier und Druck" 6 (1957), pages 173 and 174).

Contact screens with correct tone values can also be obtained by the contact method as illustrated in the following examples:

Example 7

From a diapositive contact screen obtained according to Examples 1 to 3, a contact copy is produced on to an ordinary photographic material having a fine-grained silver halide emulsion layer with a rectilinearly extending density curve, and a negative contact screen is obtained.

Example 8

Using a negative contact screen obtained according to Example 4, a contact copy is produced on an ordinary photographic material having a fine-grained silver halide emulsion layer with a rectilinearly extending density curve, and a diapositive contact screen is obtained.

Example 9

Instead of using an engraved screen, there is employed a conventional contact screen, the density formation of which is undulatory in accordance with FIGURES 1 to 3 and a contact copy is produced with this screen on one of the special films described in Examples 1 to 3. A diapositive contact screen is obtained.

Example 10

By using the procedure described in Example 9, but employing special film described in Example 4, a negative contact screen is obtained.

The present application is a continuation-in-part of my copending application Serial No. 861,400, filed December 12, 1959, now abandoned.

I claim:

1. In a contact halftone screen having a multiplicity of closely spaced relatively opaque dots separated by more transparent areas, the improvement according to which the relative gradient of light absorption density along the axes running from minimum to maximum absorption increases monotonically from between 0.7 and 0.2 at a location $\frac{1}{10}$ of the way along the axes, to between 1.8 and 2.5 at a location $\frac{9}{10}$ of the way along the axes.

2. The combination of claim 1 in which the relative gradient is between 0.55 and 0.35 at the $\frac{1}{10}$ location, and between 2 and 2.45 at the $\frac{9}{10}$ location.

3. In a contact halftone screen having a multiplicity of closely spaced relatively opaque dots separated by more transparent areas, the improvement according to which the relative gradient of light absorption density along the axes running from minimum to maximum absorption decreases monotonically from between 1.8 and 2.5 at a location $\frac{1}{10}$ of the way along the axes, to between 0.7 and 0.2 at a location $\frac{9}{10}$ of the way along the axes.

4. The combination of claim 2 in which the relative gradient is between 2 and 2.45 at the $\frac{1}{10}$ location, and between 0.55 and 0.35 at the $\frac{9}{10}$ location.

References Cited in the file of this patent

UNITED STATES PATENTS

| | | |
|---|---|---|
| 2,292,313 | Yule | Aug. 4, 1942 |
| 2,311,071 | Murray | Feb. 16, 1943 |
| 2,528,007 | Kubeserian | Oct. 31, 1950 |
| 2,961,315 | Stirling | Nov. 22, 1960 |

FOREIGN PATENTS

| | | |
|---|---|---|
| 115,094 | Australia | May 1, 1942 |
| 272,286 | Switzerland | Mar. 1, 1951 |
| 117,782 | Russia | Dec. 16, 1957 |
| 564,693 | Belgium | Aug. 11, 1958 |